(12) United States Patent
Tamura

(10) Patent No.: US 8,298,631 B2
(45) Date of Patent: Oct. 30, 2012

(54) CHOLESTERIC LIQUID CRYSTAL COMPOSITION, CIRCULARLY-POLARIZED LIGHT SEPARATING SHEET AND METHODS FOR PRODUCTION THEREOF

(75) Inventor: Kentaro Tamura, Tokyo (JP)

(73) Assignee: Zeon Corporation, Tokyo (JP)

( * ) Notice: Subject to any disclaimer, the term of this patent is extended or adjusted under 35 U.S.C. 154(b) by 481 days.

(21) Appl. No.: 12/524,373

(22) PCT Filed: Feb. 21, 2008

(86) PCT No.: PCT/JP2008/052986
§ 371 (c)(1),
(2), (4) Date: Jul. 24, 2009

(87) PCT Pub. No.: WO2008/105320
PCT Pub. Date: Sep. 4, 2008

(65) Prior Publication Data
US 2010/0110344 A1 May 6, 2010

(30) Foreign Application Priority Data
Feb. 22, 2007 (JP) ................................. 2007-042842

(51) Int. Cl.
C09K 19/52 (2006.01)
C09K 19/54 (2006.01)
G02B 5/30 (2006.01)

(52) U.S. Cl. .................... 428/1.1; 428/1.31; 252/299.01; 252/299.5

(58) Field of Classification Search .............. 349/96–98, 349/165, 175–179, 182–186, 193; 428/1.31, 428/1.1; 252/299.01, 299.5
See application file for complete search history.

(56) References Cited

U.S. PATENT DOCUMENTS

| | | | |
|---|---|---|---|
| 6,468,444 B1 | 10/2002 | Meyer et al. | |
| 6,652,776 B2 * | 11/2003 | Sato et al. | 252/299.62 |
| 6,902,687 B2 * | 6/2005 | Yumoto et al. | 252/299.61 |
| 7,187,424 B2 | 3/2007 | Parri et al. | |
| 2002/0033479 A1 * | 3/2002 | Sugiyama et al. | 252/582 |
| 2003/0085377 A1 | 5/2003 | Dunn et al. | |
| 2003/0090617 A1 | 5/2003 | Kawamoto et al. | |
| 2003/0137632 A1 | 7/2003 | Kawabata | |
| 2004/0019228 A1 | 1/2004 | Yumoto et al. | |
| 2004/0046926 A1 | 3/2004 | Ishizaki | |
| 2009/0117292 A1 | 5/2009 | Tamura | |

FOREIGN PATENT DOCUMENTS

| | | |
|---|---|---|
| JP | 6-72962 A | 3/1994 |
| JP | 2000-290315 A | 10/2000 |
| JP | 2003-66214 A | 3/2003 |
| JP | 2003-105030 A | 4/2003 |
| JP | 2003-139953 A | 5/2003 |
| JP | 2003-149439 A | 5/2003 |
| JP | 2003-313187 A | 11/2003 |
| JP | 2003-342219 A | 12/2003 |
| JP | 2004-115414 A | 4/2004 |
| JP | 2004-524568 A | 8/2004 |
| JP | 2005-289881 A | 10/2005 |
| WO | WO-98/00428 A1 | 1/1998 |
| WO | WO-2007/142206 A1 | 12/2007 |

* cited by examiner

Primary Examiner — Shean C Wu
(74) Attorney, Agent, or Firm — Birch, Stewart, Kolasch & Birch, LLP

(57) ABSTRACT

A cholesteric liquid crystal composition homogenously having a desired pitch length and pitch gradient and capable of giving a layer having a broad selective reflection bandwidth; a circularly-polarized light separating sheet having the broad selective reflection bandwidth and capable of being produced simply and homogenously; and a method for producing such a sheet. A cholesteric liquid crystal composition which contains a nematic liquid crystal compound having a reactive group, contains a chiral agent, has a $\Delta n$ value of 0.18 or more and has an absolute value of a temperature dependency parameter $\delta\lambda$ represented by $\delta\lambda=\{(2(\lambda b-\lambda a)/(\lambda b+\lambda a)\}\times\{100/(b-a)\}$ ("a" and "b" represent the temperature (° C.), $\lambda a$ represents a selective reflection center wavelength at "a" ° C. and $\lambda b$ represents the selective reflection center wavelength at "b" ° C.) of 0.50 or less at "a"=25 and "b"=100; the circularly-polarized light separating sheet having a cured layer of the composition and the selective reflection bandwidth of 300 nm or more; and a method for producing the sheet using said composition.

10 Claims, No Drawings

CHOLESTERIC LIQUID CRYSTAL COMPOSITION, CIRCULARLY-POLARIZED LIGHT SEPARATING SHEET AND METHODS FOR PRODUCTION THEREOF

TECHNICAL FIELD

The present invention relates to a cholesteric liquid crystal composition useful for producing optical materials such as circularly-polarized light separating sheets, and a circularly-polarized light separating sheet produced using the liquid crystal composition.

BACKGROUND ART

As to display devices such as liquid crystal display devices, it has been known that luminance enhancement can be achieved by providing a circularly-polarized light separating sheet having a function of allowing certain circularly-polarized light to pass therethrough and reflecting other species of light, i.e., the function of selective reflection. As such a circularly-polarized light separating sheet, those taking advantage of a selective reflection due to Bragg reflection of a substance in a state of a cholesteric liquid crystal phase have been known. Specifically, there have been known those obtained by applying, orienting and polymerizing a liquid crystal composition containing a polymerizable monomer exhibiting a cholesteric liquid crystal property on a substrate, as well as those obtained by applying and orienting a polymer exhibiting a cholesteric liquid crystal property or a solution thereof on a substrate.

In terms of enhancing the display's quality, it is preferable that the bandwidth of the selective reflection of such a circularly-polarized light separating sheet is as broad as possible within the visible light range, preferably throughout the visible light range, in order to enhance the performance of the display device. As a method for obtaining such a circularly-polarized light separating sheet exhibiting a broad selective reflection bandwidth, a variety of methods have been known. As a promising method among them, there has been known a method in which a liquid crystal compound is polymerized so as to cause a gradient in the polymerization degree of the liquid crystal compound monomer along a thickness direction of the layer, thereby providing a gradient in an orientation pitch (see Patent Document 1: JP 2003-139953-A (corresponding to US Patent Application Publication No. 2003/090617)).

However, such a method requires a very strict control of the polymerization degree in the thickness direction of the layer, which is an extremely short distance. If there is even a little inappropriateness in controlling the polymerization degree, the polymerization degree may become homogeneous over the entire layer, resulting in failure in creating the gradient in the polymerization degree, ending up with a narrowed selective reflection bandwidth of the obtained circularly-polarized light separating sheet. Also in such a method, due to a slight difference of conditions in a production environment, the orientation pitch may be greatly altered. Thus, it is very difficult to form a layer having a desired pitch length and steady gradient of the pitch.

DISCLOSURE OF INVENTION

Problem to be Solved by the Invention

It is an object of the present invention to provide a cholesteric liquid crystal composition capable of giving a layer having a desired pitch length and steady pitch gradient and having a broad selective reflection bandwidth.

It is another object of the present invention to provide a circularly-polarized light separating sheet exhibiting a broad selective reflection bandwidth and capable of being produced simply and uniformly, as well as a method for producing such a circularly-polarized light separating sheet.
Means for Solving Problem As a result of an extensive study for solving the aforementioned problems, the present inventors have found out that a liquid crystal composition comprising a particular nematic liquid crystal compound and a chiral agent and satisfying a particular temperature dependency parameter can stably give a desired pitch length and a desired pitch gradient, and have completed the present invention. That is, according to the present invention, the followings are provided.
(1) A cholesteric liquid crystal composition comprising a nematic liquid crystal compound having a reactive group, and one or more species of chiral agent, wherein said composition has:
a $\Delta n$ value of 0.18 or more, and
an absolute value of a temperature dependency parameter $\delta\lambda$ of 0.50 or less when a value "a" is 25 and a value "b" is 100, wherein said parameter $\delta\lambda$ is calculated by the formula (1):

$$\delta\lambda = \{2(\lambda b - \lambda a)/(\lambda b + \lambda a)\} \times \{100/(b-a)\} \qquad \text{formula (1)}$$

wherein "a" and "b" represent temperatures (° C.), $\lambda a$ represents a selective reflection center wavelength (nm) of said liquid crystal composition at "a" ° C., $\lambda b$ represents a selective reflection center wavelength (nm) of said liquid crystal composition at "b" ° C.
(2) The cholesteric liquid crystal composition according to (1), wherein said chiral agent has a helical twisting power HTP of 9.0 $\mu m^{-1}$ or more at 25° C., wherein HTP is calculated by the formula (2):

$$HTP = 1/(P \times 0.01C) \qquad \text{formula (2)}$$

wherein C is the concentration of said chiral agent (wt %) in said liquid crystal composition, and P is a pitch length ($\mu m$) of said nematic liquid crystal compound in said liquid crystal composition.
(3) The cholesteric liquid crystal composition according to (1) or (2), wherein:
said composition contains as said nematic liquid crystal compound a rod-shaped liquid crystal compound (A) each molecule of which has at least two reactive groups;
said composition further contains a compound (B) each molecule of which has one reactive group; and
the weight ratio of (A) and (B) is 95/5 to 50/50.
(4) The cholesteric liquid crystal composition according to (3), wherein:
said rod-shaped liquid crystal compound (A) lacks chirality;
said compound (B) has a non-liquid crystal property and lacks chirality; and
said chiral agent has a chirality, and each molecule of said chiral agent has one or more reactive groups.
(5) A circularly-polarized light separating sheet comprising a layer of a cured product of the cholesteric liquid crystal composition of any one of (1) to (4), and having a selective reflection bandwidth of 300 nm or more.
(6) A method for producing a circularly-polarized light separating sheet, said method comprising:
applying the cholesteric liquid crystal composition of any one of (1) to (4) onto a transparent resin substrate to obtain a liquid crystal layer; and applying at least one step of light irradiation and/or heating to said liquid crystal layer for curing said liquid crystal layer.

(7) A liquid crystal display device comprising a circularly-polarized light separating sheet of (5).

EFFECT OF THE INVENTION

The cholesteric liquid crystal composition of the present invention is useful as a material which enables simple and uniform production of a circularly-polarized light separating sheet exhibiting the broad reflection bandwidth since the composition can stably give the desired pitch length and the desired pitch gradient.

The method for producing the circularly-polarized light separating sheet of the present invention enables simple and uniform production of the circularly-polarized light separating sheet of the present invention exhibiting the broad selective reflection bandwidth.

BEST MODE FOR CARRYING OUT THE INVENTION

The cholesteric liquid crystal composition of the present invention contains a specific nematic liquid crystal compound and one or more species of chiral agents. These components will be described sequentially.

The cholesteric liquid crystal composition of the present invention has a Δn (refraction index anisotropy) value of 1.8 or more and preferably 0.22 or more. When the Δn value of the composition is 0.30 or more, the ultraviolet ray absorption spectrum may overlap with the visual light range at the edge of the long-wavelength side. However, even if the absorption edge of the spectrum reaches the visual light range, such a composition may be used unless the spectrum harmfully affects the desired optical performance. With such a high Δn value, it is possible to give a circularly-polarized light separating sheet having a high optical performance (e.g., circularly-polarized light separating property). The upper limit of the Δn value is not particularly limited, but usually may be 0.4 or less.

When the cholesteric liquid crystal composition of the present invention contains two or more species of the nematic liquid crystal compounds, the Δn value thereof may be obtained from each nematic liquid crystal compound's Δn value and the containing ratio thereof.

In the present invention, the nematic liquid crystal compound has a reactive group. The number of the reactive groups in each molecule of the compound may be one or more, and preferably two or more. In particular, it is preferable that the cholesteric liquid crystal composition of the present invention contains, as the nematic liquid crystal compound, a rod-shaped liquid crystal compound (A) each molecule of which has at least two reactive groups, and that the composition further contains a compound (B) each molecule of which has one reactive group, wherein the weight ratio of (A) and (B) is 95/5 to 50/50. The weight ratio of the compounds (A) and (B) may more preferably be 90/10 to 70/30. The ratio of the compound (A) in the total amount of the compounds (A) and (B) may be adjusted to 95% by weight or less, for inhibiting occurrence of an orientation defect, in order to thereby improve the optical performance such as the circularly-polarized light separating property. Also by adjusting the ratio of the compound (A) to 50% by weight or more, it is possible to keep the high liquid crystal property and obtain the desired optical performance.

It is preferable that the compound (A) lacks chirality. The compound (B) may have or may lack liquid crystal property, but it is preferable to lack liquid crystal property. In the present invention, if possible, it is more preferable that the compound (B) lacks chirality. If the compound (B) has chirality, the bandwidth is excessively widened and reflectance is thereby lowered in some cases upon selective reflection bandwidth widening, or conversely the bandwidth is not widened in other cases, which are not preferable. However, even if a sole molecule of the compound has chirality, such a compound may still be used preferably when the compound is used as a racemic body and the chirality is substantially negligible.

Examples of the reactive group may specifically include epoxy, thioepoxy, oxetane, thietanyl, aziridinyl, pyrrol, fumarate, cinnamoyl, isocyanate, isothiocyanate, amino, hydroxyl, carboxyl, alkoxysilyl, mercapto, vinyl, allyl, methacryl and acryl groups. Using compounds having these reactive groups, a stable cured product can be obtained upon curing the cholesteric liquid crystal composition of the present invention. Using compounds each molecule of which has two or more reactive groups, highly practical and preferable film strength can be obtained as a result of crosslinking which occurs upon the cholesteric liquid crystal composition is cured. The preferable film strength referred to herein is HB or harder, and preferably H or harder in terms of pencil hardness (JIS K5400). When the film strength is softer than HB, the film tends to have scratch scar easily and therefore have an insufficient handling property, thus not being preferable. The upper limit of the preferable pencil hardness is not particularly limited as long as the hardness does not harmfully affect the optical performance and durability tests.

An example of the rod-shaped liquid crystal compound (A) each molecule of which has at least two reactive groups may be a compound represented by the formula (3):

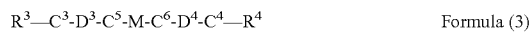

Formula (3)

wherein $R^3$ and $R^4$ are the reactive groups, and each independently represent a group selected from the group consisting of (meth)acryl, (thio)epoxy, oxetane, thietanyl, aziridinyl, pyrrol, vinyl, allyl, fumarate, cinnamoyl, oxazoline, mercapto, iso(thio)cyanate, amino, hydroxyl, carboxyl and alkoxysilyl groups; $D^3$ and $D^4$ represent groups selected from the group consisting of a single bond, a straight or branched alkyl groups having 1 to 20 carbon atoms and straight or a branched alkylene oxide groups having 1 to 20 carbon atoms; $C^3$ to $C^6$ represent groups selected from the group consisting of a single bond, —O—, —S—, —S—S—, —CO—, —CS—, —OCO—, —CH$_2$—, —OCH$_2$—, —CH=N—N=CH—, —NHCO—, —OCOO—, —CH$_2$COO— and —CH$_2$OCO—; M represents a mesogenic group and specifically is consisting of two to four skeletons selected from the group of azomethines, azoxys, biphenyls, terphenyls, naphthalenes, anthracenes, cyanobiphenyls, cyanophenyl esters, benzoate esters, cyclohexane carboxylate phenyl esters, cyanophenyl cyclohexanes, cyano-substituted phenylpyrimidines, alkoxy-substituted phenylpyrimidines, phenyldioxanes, tolans and alkenylcyclohexylbenzonitriles which may be unsubstituted or substituted with one or more of halogen atoms, hydroxyl group, carboxyl group, cyano group, amino group, and a straight or branched alkyl or halogenated alkyl group having 1 to 10 carbon atoms, wherein the skeletons are bound via a binding group such as —O—, —S—, —S—S—, —CO—, —CS—, —OCO—, —CH$_2$—, —OCH$_2$—, —CH=N—N=CH—, —NHCO—, —OCOO—, —CH$_2$COO— and —CH$_2$OCO—.

In the present invention, it is preferable that the rod-shaped liquid crystal compound (A) has an asymmetric structure. The asymmetric structure refers to a structure wherein, centering on the mesogenic group M, the structures of $R^3$—$C^3$-$D^3$-$C^5$— and $C^6$-$D^4$-$C^4$—$R^4$ are different from each other. Using a rod-shape liquid crystal compound (A) having such an asymmetric structure, orientation uniformity can further be enhanced.

An example of the compound (B) each molecule of which has one reactive group may be a compound represented by the following formula (4):

$$R^1\text{-}A^1\text{-}B\text{-}A^2\text{-}R^2 \qquad (4)$$

In the general formula (4), one of $R^1$ and $R^2$ is the reactive group and each independently represents a group selected from the group consisting of (meth)acryl, (thio)epoxy, oxetane, thietanyl, aziridinyl, pyrrol, vinyl, allyl, fumarate, cinnamoyl, oxazoline, mercapto, iso(thio)cyanate, amino, hydroxyl, carboxyl and alkoxysilyl groups. The other is a non-reactive group and is a group selected from the group consisting of a straight or branched alkyl group having 1 to 20 carbon atoms, a straight or branched alkylene oxide group having 1 to 20 carbon atoms, hydrogen atom, halogen atom and cyano group. (Meth)acryl herein means acryl and methacryl.

The alkyl group and the alkylene oxide group may be unsubstituted or substituted with one or more halogen atoms. The halogen atom, the hydroxyl, carboxyl, (meth)acryl, epoxy, mercapto, isocyanate, amino and cyano groups may be bound to the alkyl group or alkylene oxide group having 1 to 2 carbon atoms.

In the general formula (4), $A^1$ and $A^2$ each independently represent a group selected from the group consisting of 1,4-phenylene, 1,4-cyclohexylene, 1,4-cyclohexenyl, 4,4'-biphenylene, 4,4'-bicyclohexylene and 2,6-naphthylene groups. The 1,4-phenylene, 1,4-cyclohexylene, 1,4-cyclohexenyl, 4,4'-biphenylene, 4,4'-bicyclohexylene and 2,6-naphthylene groups may be unsubstituted or substituted with one or more of halogen atom, hydroxyl group, carboxyl group, cyano group, amino group, and an alkyl or halogenated alkyl group having 1 to 10 carbon atoms. When each of $A^1$ and $A^2$ has two or more substituents, they may be the same or different.

Particularly preferable examples of $A^1$ and $A^2$ may include a group selected from the group consisting of 1,4-phenylene, 4,4'-biphenylene and 2,6-naphthylene. These aromatic ring skeletons are relatively rigid when compared with alicyclic skeletons. These skeletons have a high affinity with the mesogenic group in the rod-shaped liquid crystal compound contained in the liquid crystal composition of the present invention. Therefore, these skeletons can give an enhanced orientation uniformity.

In the general formula (4), B is selected from the group consisting of a single bond, —O—, —S—, —S—S—, —CO—, —CS—, —OCO—, —CH$_2$—, —OCH$_2$—, —CH=N—N=CH—, —NHCO—, —OCOO—, —CH$_2$COO— and —CH$_2$OCO—.

Particularly preferable examples of B may include the single bond and —OCO—.

The compound of the general formula (4) may have or may not have the liquid crystal property, but preferably has no liquid crystal property. It is preferable that the chirality of the compound of the general formula (4) is as weak as possible. If the compound has the chirality, the attempt to extend the selective reflection bandwidth may sometimes result in excessive bandwidth extension which lowers the reflectance, or sometimes result in non-occurrence of the bandwidth extension, thus not being preferable. However, even if the compound has the chirality, when the compound is used as the racemic body and the chirality is substantially negligible, then the compound can be used preferably. It is also preferable that the cholesteric liquid crystal composition of the present invention contains, as the compound of the general formula (4), a mixture of a plurality of species of optical isomers. For example, the composition may contain a mixture of a plurality of species of enantiomers and/or diastereomers. The compound of the general formula (4) preferably has a melting point ranging from 50° C. to 150° C.

The concentration of the nematic liquid crystal compound in the cholesteric liquid crystal composition of the present invention is not particularly limited and may be 40 to 99% by weight. When the compound (B) has the liquid crystal property, the amount of the compound (B) may be taken into account as a part of the amount for considering the concentration of the nematic liquid crystal compound.

The cholesteric liquid crystal composition of the present invention contains one or more species of chiral agents. The chiral agent has chirality and may preferably have a reactive group. Examples of the reactive group may include those exemplified as the reactive groups for the compounds (A) and (B). It is preferable that the chiral agent has a helical twisting power (HTP) of 9.0 µm$^{-1}$ or more at 25° C. More preferably HTP may be 30.0 µm$^{-1}$ or more. The upper limit of HTP is not particularly limited, but usually may be 200 µm$^{-1}$ or less. The value of HTP is obtained by the following formula (2):

$$HTP=1/(P\times 0.01C) \qquad \text{Formula (2)}$$

wherein C represents the concentration (% by weight) of the chiral agent in the liquid crystal composition, and P represents the pitch length (µm) of the nematic liquid crystal compound in the liquid crystal composition. The pitch length P of the liquid crystal compound is obtainable from a selective reflection center wavelength λ and a mean refraction index n of the liquid crystal layer obtained by applying the cholesteric liquid crystal composition of the present invention onto a substrate, with a relational expression λ=n×P. The method for measuring the selective reflection center wavelength is not particularly limited, and specifically the wavelength may be measured using a spectrophotometer (e.g., Instaneous Multi-Photometry System MCPD-3000 supplied from Otsuka Electronics Co., Ltd.) and a microscope (e.g., polarization microscope ECLIPSE E600-POL supplied from Nikon Corporation). The method for measuring the refraction index n is not particularly limited. Specifically, the refraction index is obtainable by using a prism coupler or Abbe's refractometer, or utilizing a nature that, when an incident angle to a cholesteric liquid crystal layer is increased upon measuring the selective reflection wavelength, the selective reflection bandwidth of the selective reflection wavelength shifts to a short wavelength side. The value may be calculated with the following relational expression.

$$\lambda = \lambda_n \times \cos\left(\sin^{-1}\left(\frac{\sin\phi}{n}\right)\right)$$

In the formula, φ represents the incident angle (with respect to the normal line direction being 0 degree) and λn represents the selective reflection center wavelength when φ=0. By using the chiral agent having high HTP, the pitch can be shortened and the twisting degree can be increased in the liquid crystal compound without impairing the liquid crystal property of the liquid crystal compound. Furthermore a temperature dependency parameter which will be described later can be adjusted easily.

As specific examples of the chiral agent, those described in JP 2005-289881-A, JP 2004-115414-A, JP 2003-66214-A, JP 2003-313187-A, JP 2003-342219-A, JP 2000-290315-A, JP Hei-6-072962-A, U.S. Pat. No. 6,468,444 and WO98/00428 may be appropriately used. For example, Palio Color LC756 supplied from BASF and Chiracol CNL617R and CNL-686L supplied from ADEKA are available.

The concentration of the chiral agent in the cholesteric liquid crystal composition of the present invention is not particularly limited, but may be 1 to 60% by weight.

As the combination of the components in the cholesteric liquid crystal composition of the present invention, the combination of the following (a), (b) and (c) is particularly preferable:

(a) as the compound (A), a compound having nematic liquid crystal property and no chirality, each molecule of which has two or more reactive groups;
(b) as the compound (B), a compound having no liquid crystal property and no chirality, each molecule of which has one reactive group; and
(c) as the chiral agent, a compound having chirality, each molecule of which has one or more reactive group.

It is more preferable that the chiral agent of the aforementioned (c) further has non-liquid crystal property.

The cholesteric liquid crystal composition of the present invention may optionally contain a crosslinking agent for enhancing film strength and durability after curing. As the crosslinking agent, those which elevates the crosslinking density of the cured liquid crystal layer as a result of the reaction which simultaneously occurs with curing of the liquid crystal layer that has been obtained by application of the liquid crystal composition, as a result of promotion of the reaction by heat treatment after curing, or as a result of spontaneous reaction with moisture, and which do not deteriorate the orientation uniformity may be appropriately selected for use. Those that are cured with ultraviolet ray, the heat or the moisture may be used suitably. Specific examples of the crosslinking agent may include polyfunctional acrylate compounds such as trimethylolpropane tri(meth)acrylate, pentaerythritol tri(meth)acrylate, pentaerythritol tetra(meth)acrylate, dipentaerythritol hexa(meth)acrylate and 2-(2-vinyloxyethoxy)ethyl acrylate; epoxy compounds such as glycidyl(meth)acrylate, ethylene glycol diglycidyl ether, glycerine triglycidyl ether and pentaerythritol tetraglycidyl ether; aziridine compounds such as 2,2-bishydroxymethylbutanol-tris[3-(1-aziridinyl)propionate], 4,4-bis(ethyleneiminocarbonylamino)diphenylmethane and trimethylolpropane-tri-β-aziridinyl propionate; isocyanate compounds such as hexamethylene diisocyanate, as well as isocyanurate-type isocyanate, biuret-type isocyanate and adduct-type isocyanate derived from hexamethylene diisocyanate; polyoxazoline compounds having an oxazoline group in a side chain; and alkoxysilane compounds such as vinyltrimethoxysilane, N-(2-aminoethyl) 3-aminopropyltrimethoxysilane, 3-aminopropyltrimethoxysilane, 3-glycidoxypropyltrimethoxysilane, 3-(meth)acryloxypropyltrimethoxysilane and N-(1,3-dimethylbutylidene)-3-(triethoxysilyl)-1-propaneamine. A publicly known catalyst may be used depending on the reactivity of the crosslinking agent in order to enhance productivity in addition to the enhancement of the film strength and the durability.

The concentration of the crosslinking agent is preferably 0.1 to 15% by weight in the cured liquid crystal layer obtained by curing the cholesteric liquid crystal composition. The concentration of the crosslinking agent being less than 0.1% by weight may result in insufficient enhancement of the crosslinking density, whereas the concentration being more than 15% by weight may result in reduction in the stability of the liquid crystal layer, both of which are not preferable.

The cholesteric liquid crystal composition of the present invention may optionally contain a photopolymerization initiator. As the photopolymerization initiator, publicly known compounds that generate a radical or an acid upon application of the ultraviolet ray or visible light ray may be used. Specific examples thereof may include benzoin, benzylmethyl ketal, benzophenone, biacetyl, acetophenone, Michler's ketone, benzyl, benzylisobutyl ether, tetramethylthiuram mono(di)sulfide, 2,2-azobisisobutyronitrile, 2,2-azobis-2,4-dimethylvaleronitrile, benzoyl peroxide, di-tert-butyl peroxide, 1-hydroxycyclohexyl phenyl ketone, 2-hydroxy-2-methyl-1-phenyl-propane-1-one, 1-(4-isopropylphenyl)-2-hydroxy-2-methylpropane-1-one, thioxanthone, 2-chlorothioxanthone, 2-methylthioxanthone, 2,4-diethylthioxanthone, methylbenzoyl formate, 2,2-diethoxyacetophenone, β-ionone, β-bromostyrene, diazoaminobenzene, α-amyl cinnamic aldehyde, p-dimethylaminoacetophenone, p-dimethylaminopropiophenone, 2-chlorobenzophenone, p,p'-dicholobenzophenone, p,p'-bisdiethylaminobenzophenone, benzoin ethyl ether, benzoin isopropyl ether, benzoin n-propyl ether, benzoin n-butyl ether, diphenyl sulfide, bis(2,6-methoxybenzoyl)-2,4,4-trimethyl-pentylphosphine oxide, 2,4,6-trimethylbenzoyldiphenyl-phosphine oxide, bis(2,4,6-trimethylbenzoyl)-phenyl phosphine oxide, 2-methyl-1[4-(methylthio)phenyl]-2-morpholinopropane-1-one, 2-benzyl-2-dimethylamino-1-(4-morpholinophenyl)-butane-1-one, anthracene benzophenone, α-chloroanthraquinone, diphenyl disulfide, hexachlorobutadiene, pentachlorobutadiene, octachlorobutene, 1-chloromethylnaphthalene, 1,2-octadiene, 1-[4-(phenylthio)-2-(o-benzoyl)]oxime, 1-[9-ethyl-6-(2-methylbenzoyl)-9H-carbazole-3-yl]ethanone 1-(o-acetyloxime), (4-methylphenyl)[4-(2-methylpropyl)phenyl] iodonium hexafluorophosphate, 3-methyl-2-butynyltetramethylsulfonium hexafluoroantimonate and diphenyl-(p-phenylthiophenyl)sulfonium hexafluoroantimonate. If necessary, two or more compounds may be mixed depending on a desired physical property. If necessary, a publicly known photosensitizer and a tertiary amine compound as a polymerization accelerator may also be added in order to control a curable property.

The amount of the polymerization initiator to be added is preferably 0.3 to 7% by weight in the cholesteric liquid crystal composition. When the amount of the polymerization initiator is less than 0.3% by weight, the polymerization degree is sometimes reduced and the film strength is impaired thereby, thus not being preferable. When the amount is more than 7% by weight, the orientation of the liquid crystal is sometimes inhibited which renders the liquid crystal phase unstable, thus not being preferable.

The cholesteric liquid crystal composition of the present invention may optionally contain a surfactant. As the surfactant, those that do not inhibit the orientation may be appropriately selected for use. As the surfactant, specifically a nonionic surfactant containing siloxane and an alkyl fluoride group in a hydrophobic group moiety may be used suitably. An oligomer each molecule of which has two or more hydrophobic group moieties is particularly suitable. As these surfactants, it is possible to use PF-151N, PF-636, PF-6320, PF-656, PF-6520, PF-3320, PF-651 and PF-652 of PolyFox supplied from OMNOVA, FTX-209F, FTX-208G and FTX-204D of Ftergent supplied from Neos Co., Ltd., and KH-40 of Surflon supplied from Seimi Chemical Co., Ltd. The concentration of the surfactant to be added is preferably 0.05 to 3% by weight in the cured liquid crystal layer obtained by curing the cholesteric liquid crystal compound. When the concentration of the surfactant is less than 0.05% by weight, an orientation regulation force on the interface with air is sometimes reduced to cause a defect in the orientation, thus not being preferable. When the concentration is more than 3% by weight, an excessive amount of surfactant is sometimes inserted into intermolecular spaces in the liquid crystal to reduce the orientation uniformity, thus not being preferable.

If necessary, the cholesteric liquid crystal composition of the present invention may further contain other optional components. Examples of the optional components may include solvents, polymerization inhibitors for enhancing a pot life, antioxidants for enhancing the durability, ultraviolet ray absorbers and light stabilizers. The amount of these optional components to be added may be in a range by which the desired optical performance is not impaired.

In the cholesteric liquid crystal composition of the present invention, an absolute value of the temperature dependency parameter $\delta\lambda$ represented by the formula (1):

$$\delta\lambda = \{(2(\lambda b - \lambda a)/(\lambda b + \lambda a)\} \times \{100/(b-a)\} \quad \text{Formula (1)}$$

is 0.50 or less and preferably 0.25 or less when "a"=25 and "b"=100. In the formula (1), "a" and "b" represent the temperature (° C.), $\lambda a$ (nm) represents the selective reflection center wavelength of the liquid crystal composition at "a" ° C., and $\lambda b$ (nm) represents the selective reflection center wavelength of the liquid crystal composition at "b" ° C. By having such a temperature dependency parameter, the desired broad selective reflection bandwidth may be obtained easily.

Without being bound to a particular theory, such an effect is believed to be obtained as follows. That is, when a layer surface of the liquid crystal composition is irradiated with weak light for curing, the gradient of the polymerization degree is produced due to the difference of the light amount delivered from the layer surface depending on a layer depth, which causes a gradient of the selective reflection wavelength, and thus gives an extended bandwidth of the selective reflection wavelength. However, when the absolute value of the temperature dependency parameter is high, the selective reflection wavelength is largely changed due to a temperature change caused by the heat of light irradiation and the occurrence of polymerization heat, and it becomes difficult to obtain a gradient of the polymerization degree that reflects the amount of the light that has been delivered from the surface. Thus, by controlling the absolute value of the temperature dependency parameter within a predetermined range, it becomes possible to homogenously produce the gradient of the good selective reflection wavelength.

The method for adjusting the temperature dependency parameter of the liquid crystal composition within the predetermined range is not particularly limited, and it is possible to adjust the temperature dependency parameter by selecting a viscosity of the liquid crystal composition, and the type and concentration of the chiral agent. By adjusting the viscosity of the liquid crystal composition to 100 mPa·s or higher at 90° C., it is possible to adjust the temperature dependency parameter $\delta\lambda$ to 0.50 or less, although the preferable range depends on the type and concentrations of the respective components in the liquid crystal composition. In order to adjust the viscosity of the liquid crystal composition to 100 mPa·s or higher at 90° C., the weight ratio of the compound (A) each molecule of which has two reactive groups with respect to the compound (B) each molecule of which has one reactive group is adjusted to be 95/5 to 50/50. The viscosity of the liquid crystal composition may be adjusted by appropriately controlling the concentrations of the components such as the solvent.

The method for producing the cholesteric liquid crystal composition of the present invention is not particularly limited, and the cholesteric liquid crystal composition may be produced by mixing the aforementioned essential components and the optional components.

The circularly-polarized light separating sheet of the present invention has a layer of the cured product of the cholesteric liquid crystal composition of the present invention (obtained by curing the cholesteric liquid crystal composition of the present invention) and has a selective reflection bandwidth of 300 nm or more. The upper limit of the selective reflection bandwidth broadness is not particularly limited, and usually may be 600 nm or less. The selective reflection bandwidth may be obtained by measurement of a transmission spectrum using the spectrophotometer (e.g., Instaneous Multi-Photometry System MCPD-3000 supplied from Otsuka Electronics Co., Ltd.) and the microscope (e.g., polarization microscope ECLIPSE E600-POL supplied from Nikon Corporation), and calculation on the basis of the measurement. More specifically, a half value width of a selective reflection peak in the measured transmission spectrum may be regarded as the value of the selective reflection bandwidth.

The circularly-polarized light separating sheet of the present invention may be produced by a method including a step of applying the cholesteric liquid crystal composition of the present invention onto a transparent resin substrate for obtaining a liquid crystal layer, and a step of curing the liquid crystal layer by at least one light irradiation and/or heat treatment.

The transparent resin substrate is not particularly limited, and a substrate having a total light transmittance of 80% or more when having a thickness of 1 mm may be used. Specific examples thereof may include a monolayer or laminated film composed of synthetic resins such as alicyclic olefin polymers, chain-shaped olefin polymers such as polyethylene and polypropylene, triacetylcellulose, polyvinyl alcohol, polyimide, polyarylate, polyester, polycarbonate, polysulfone, polyether sulfone, modified acryl polymers, epoxy resins, polystyrene and acrylic resins. Among them, the alicyclic olefin polymers and the chain-shaped olefin polymers are preferable. The alicyclic olefin polymers are particularly preferable in terms of transparency, low hygroscopic property, size stability and light weight property.

If necessary, the transparent resin substrate may have an orientation film. By having the orientation film, the cholesteric liquid crystal composition applied thereon can be oriented in a desired direction. The orientation film may be formed by, after an optional corona discharge treatment to the substrate surface, applying a solution using the publicly known method such as a reverse gravure coating, a direct gravure coating, a die coating or a bar coating, followed by drying and subsequent rubbing treatment to the dried coated layer, wherein the solution may contain cellulose, a silane coupling agent, polyimide, polyamide, modified polyamide, polyvinyl alcohol, epoxy acrylate, a silanol oligomer, polyacrylonitrile, a phenol resin, polyoxazole or cyclized polyisoprene dissolved in water or a solvent. The thickness of the orientation film may be a thickness whereby the desired orientation uniformity of the liquid crystal layer is obtained, and is preferably 0.001 to 5 μm and more preferably 0.01 to 2 μm.

Application of the liquid crystal composition onto the transparent resin substrate may be performed by a publicly known method, e.g., reverse gravure coating, direct gravure coating, die coating or bar coating. The thickness of the applied layer of the liquid crystal composition may be appropriately adjusted so that a desired dry film thickness of the cured liquid crystal layer described later is obtained.

Before curing the applied layer obtained by the application, an orientation treatment may optionally be given thereto. The orientation treatment may be performed by heating the applied layer at 50 to 150° C. for 0.5 to 10 minutes. By giving the orientation treatment, the cholesteric liquid crystal layer may be well oriented. In the oriented layer, usually the liquid crystal composition is in a cholesteric phase wherein the liquid crystal composition is oriented so that its major axis is in parallel with a plane direction of the layer, and the composition also has a helical axis in a direction perpendicular to the plane direction.

After giving the optional orientation treatment, the cholesteric liquid crystal composition may be cured to give a circularly-polarized light separating sheet having a layer of the cured product of the cholesteric liquid crystal composition (the layer may be simply referred to as a "cured liquid crystal layer" in the present description). The step of curing may be performed by combining one or more of the light irradiations and the heat treatments. Specific conditions for heat treatment may be, for example, at the temperature of 40 to 140° C. and for a time period of one second to three minutes. The light used for the light irradiation in the present invention may include visual light, ultraviolet ray and other electromagnetic waves. Specifically the light irradiation may be performed by irradiating with the light having a wavelength of 200 to 500 nm for 0.01 seconds to 3 minutes. A combination of the irradiation with weak ultraviolet ray of, e.g., 0.01 to 50 mJ/cm$^2$ and the heating may be repeated in an alternate manner for a plurality of times, whereby a circularly-polarized light sheet having a broader reflection bandwidth may be obtained. After broadening the reflection bandwidth by the irradiation with the weak ultraviolet ray, irradiation with the relatively strong ultraviolet ray of 50 to 10,000 mJ/cm$^2$ may be performed to completely polymerize the liquid crystal compound, for obtaining the cured liquid crystal layer.

In the present invention, the number of performing the combination of the steps of applying and curing the cholesteric liquid crystal composition on the transparent resin substrate is not limited to one. The application and the curing may be repeated for a plurality of times, to form a cured liquid crystal layer having two or more layers. However, in the present invention, a cured liquid crystal layer oriented well can be formed easily even by performing only once the combination of the steps of applying and curing of the cholesteric liquid crystal composition.

In the circularly-polarized light separating sheet of the present invention, the dry film thickness of the cured liquid crystal layer may be preferably 3.0 to 10.0 μm, more preferably 3.0 to 9.0 μm and particularly preferably 3.5 to 8.0 μm. The dry film thickness of the cured liquid crystal layer being thinner than 3.0 μm may result in a reduced reflectance, whereas the thickness thicker than 10.0 μm may result in coloration of the layer when observed from an oblique direction with respect to the cured liquid crystal layer, both of which are not preferable.

The circularly-polarized light sheet of the present invention may be used for any usages without any particular limitation. Particularly, the sheet may be used as a constituent of the display devices such as liquid crystal display devices. Specifically, for example, the circularly-polarized light sheet may be disposed as a luminance enhancement sheet in combination with a ¼ λ plate, between a backlight and a liquid crystal cell in the liquid crystal display device. More specifically, the circularly-polarized light sheet of the present invention may be disposed between the backlight and the liquid crystal cell in the liquid crystal display device so that the circularly-polarized light sheet is closer to the backlight than the ¼ λ plate, for achieving enhancement of the luminance.

EXAMPLES

The present invention will be described in more detail with reference to the following Examples, but the present invention is not limited thereto.

Example 1

1-1. Preparation of Transparent Resin Substrate Having Orientation Film

Corona discharge treatment was performed on both sides of a film composed of an alicyclic olefin polymer (brand name: ZEONOR Film ZF14-100 supplied from Optes Inc.). An aqueous solution of 5% polyvinyl alcohol was applied onto one side of the film using a #2 wire bar, and the coating film was dried, to form an orientation film having a film thickness of 0.1 μm. Then, a rubbing treatment was given to the orientation film to prepare a transparent resin substrate having the orientation film.

1-2. Formation of Cholesteric Liquid Crystal Layer

Respective components of materials to be used were mixed at ratio shown in Table 1, to prepare a cholesteric liquid crystal composition containing about 40% by weight of a solid content. This cholesteric liquid crystal composition was applied onto a surface of the orientation film on the transparent resin substrate having the orientation film prepared in aforementioned 1-1 using a #10 wire bar. An orientation treatment at 100° C. for 5 minutes was given to the coated layer, to form a cholesteric liquid crystal layer having a dry film thickness of 5 μm.

1-3. Temperature Dependency of Selective Reflection Wavelength

While the cholesteric liquid crystal layer prepared in aforementioned 1-2 was heated at either one of the conditions of 100° C. and 25° C. using a thermal analysis device (Hot Stage FP82HT supplied from Mettler-Toledo KK), a selective reflection center wavelength was measured using a spectrophotometer (Instaneous Multi-Photometry System MCPD-3000 supplied from Otsuka Electronics Co., Ltd.) and a microscope (polarization microscope ECLIPSE E600-POL supplied from Nikon Corporation). The temperature dependency of the selective reflection wavelength was calculated from the obtained selective reflection center wavelengths $\lambda_{25}$ and $\lambda_{100}$ at 25° C. and 100° C., respectively, with the following formula. The values thus obtained are shown in Table 1.

$$\delta\lambda = \{2\ (\lambda_{100}-\lambda_{25})/(\lambda_{100}+\lambda_{25})\} \times \{100/(100-25)\}$$

1-4. Calculation of HTP

HTP (μm$^{-1}$) at 25° C. was calculated by the following formulae (1) and (II) using the selective reflection center wavelength $\lambda_{25}$ at 25° C. obtained in the aforementioned (1-3). The values thus obtained are shown in Table 1.

$$P = \lambda/n \times 1/1000 \qquad \text{Formula (1)}$$

$$HTP = 1/(P \times 0.01C) \qquad \text{Formula (II)}$$

P: Pitch length (μm)
λ: Selective reflection center wavelength (m, at 25° C. here)
n: Mean refraction index of liquid crystal layer
C: Concentration of total chiral agent (% by weight)

1-5. Production of Circularly-Polarized Light Separating Sheet

The cholesteric liquid crystal layer was irradiated with an ultraviolet ray of 6 mJ/cm$^2$ from the side of the transparent resin substrate, and heated at 100° C. for one minute. After cooling the film, again the cholesteric liquid crystal layer was irradiated with an ultraviolet ray of 6 mJ/cm$^2$ from the side of the transparent resin substrate, and heated at 100° C. for one minute. Then, the cholesteric liquid crystal layer was irradiated with an ultraviolet ray of 500 mJ/cm² from the side of the cholesteric liquid crystal layer, to make a circularly-polarized light separating sheet.

1-6. Evaluation of Circularly-Polarized Light Separating Sheet

The transmission spectrum of the film prepared in the aforementioned (1-5) was measured using the spectrophotometer (Instaneous Multi-Photometry System MCPD-3000 supplied from Otsuka Electronics Co., Ltd.) and the microscope (polarization microscope ECLIPSE E600-POL supplied from Nikon Corporation). The half value widths of the selective reflection bandwidth are shown in Table 1.

Examples 2 to 6 and Comparative Examples 1 to 2

Circularly-polarized light separating sheet were produced and the selective reflection bandwidths were evaluated in the same manner as in Example 1, except that a composition of the cholesteric liquid crystal composition was changed as shown in Tables 1 and 2. Evaluation results are shown in Tables 1 and 2. From the results in Tables 1 and 2, the followings are recognized. The cholesteric liquid crystal composition in Examples can give a circularly-polarized light separating sheet having a broad selective reflection bandwidth. On the contrary, the products having a temperature dependency δλ of the selective reflection center wavelength larger than the range defined in the present invention (Comparative Examples 1 and 2) resulted in inferior broadness of the selective reflection bandwidth of the obtained circularly-polarized light separating sheet.

TABLE 1

| Material used | Ex. 1 | Ex. 2 | Ex. 3 | Ex. 4 |
| --- | --- | --- | --- | --- |
| Rod-shaped liquid crystal compound 1 | 27.21 | 28.18 | | |
| Rod-shaped liquid crystal compound 2 | | | 28.18 | 21.92 |
| Compound 1 | 9.04 | 7.01 | 7.04 | 5.48 |
| Chiral agent 1 | 2.23 | | | |
| Chiral agent 2 | 0.28 | 3.54 | 3.54 | |
| Chiral agent 3 | | | | 12.60 |
| Chiral agent 4 | | | | |
| Chiral agent 5 | | | | |
| Polymerization initiator | 1.20 | 1.20 | 1.20 | 1.20 |
| Surfactant | 0.04 | 0.04 | 0.04 | 0.04 |
| 2-butanone | 60.00 | 60.00 | 60.00 | 60.00 |
| Δn of the liquid crystal composition | 0.19 | 0.19 | 0.21 | 0.21 |
| Selective reflection center wavelength at 25° C. (nm) | 530 | 505 | 540 | 580 |
| Selective reflection center wavelength at 100° C. (nm) | 555 | 630 | 632 | 535 |
| Temperature dependency of the selective reflection center wavelength δλ | 0.06 | 0.29 | 0.21 | −0.11 |
| HTP of the chral agent in total (μm⁻¹) | 48.69 | 35.64 | 33.20 | 8.96 |
| Selective reflection bandwidth (nm) | 360 | 310 | 320 | 390 |

TABLE 2

| Material used | Ex. 5 | Ex. 6 | Comp. Ex. 1 | Comp. Ex. 2 |
| --- | --- | --- | --- | --- |
| Rod-shaped liquid crystal compound 1 | | | | 21.00 |
| Rod-shaped liquid crystal compound 2 | 19.20 | 15.40 | 30.00 | |
| Compound 1 | 4.80 | 5.13 | | 9.00 |
| Chiral agent 1 | | 1.34 | | |
| Chiral agent 2 | | | | |
| Chiral agent 3 | | 16.90 | | |
| Chiral agent 4 | 16.00 | | | |
| Chiral agent 5 | | | 10.00 | 10.00 |
| Polymerization initiator | 1.20 | 1.20 | 1.20 | 1.20 |
| Surfactant | 0.04 | 0.04 | 0.04 | 0.04 |
| 2-butanone | 60.00 | 60.00 | 60.00 | 60.00 |
| Δn of the liquid crystal composition | 0.21 | 0.20 | 0.22 | 0.19 |
| Selective reflection center wavelength at 25° C. (nm) | 590 | 575 | 535 | 515 |
| Selective reflection center wavelength at 100° C. (nm) | 430 | 415 | 795 | 790 |
| Temperature dependency of the selective reflection center wavelength δλ | −0.42 | −0.43 | 0.52 | 0.56 |
| HTP of the chral agent in total (μm⁻¹) | 6.94 | 6.71 | 12.25 | 12.78 |
| Selective reflection bandwidth (nm) | 330 | 315 | 250 | 140 |

Compounds in Tables 1 and 2 indicate the followings.

Rod-shaped liquid crystal compound 1: Δn 0.18, two reactive groups in each molecule, mean refraction index 1.645, crystal-nematic phase transition temperature (CN point) 105° C., no chirality, having liquid crystal property, symmetrical structure.

Rod-shaped liquid crystal compound 2: Δn 0.23, two reactive groups in each molecule, mean refraction index 1.638, crystal-nematic phase transition temperature (CN point) 100° C., no chirality, having liquid crystal property, asymmetrical structure.

Compound 1: compound represented by the following formula (one reactive group in each molecule, non-liquid crystal property)

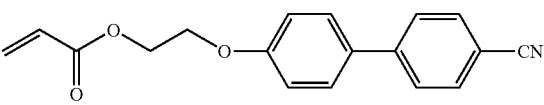

Chiral agent 1: LC756 (supplied from BASF) (non-liquid crystal property, two reactive groups in each molecule)

Chiral agent 2: a compound containing an isosorbide skeleton, represented by the following formula (non-liquid crystal property, one reactive group in each molecule)

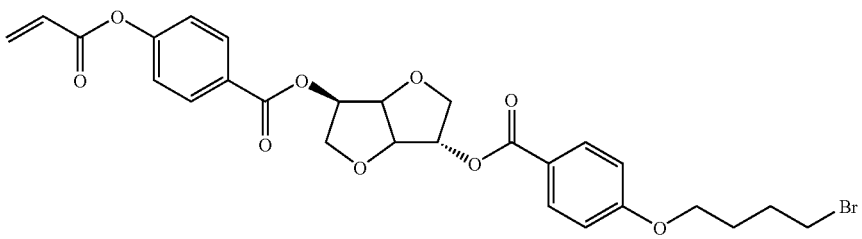

Chiral agent 3: Adeka Chiracol CNL-686L (supplied from ADEKA) (non-liquid crystal property, no reactive group in each molecule)

Chiral agent 4: Adeka Chiracol CNL-617R (supplied from ADEKA) (non-liquid crystal property, no reactive group in each molecule)

Chiral agent 5: Adeka Chiracol CNL-712R (supplied from ADEKA) (non-liquid crystal property, no reactive group in each molecule)

Polymerization initiator: Irgacure 907 (supplied from Ciba Specialty Chemicals)

Surfactant: fluorine-based surfactant KH40 (supplied from Seimi Chemical Co., Ltd.)

Example 7

A transparent resin substrate having an orientation film which is the same as that in (1-1) of Example 1 was prepared as a roll of a lengthy film. A system for successively performing the rubbing treatment in the step (1-1) and the steps (1-2) and (1-5) in Example 1 was assembled, and the transparent resin substrate was fed thereto from the roll, to continuously produce a lengthy circularly-polarized light separating sheet. The working environment at that time was kept at 15 to 30° C. and a line speed was 10 m/minute.

As to the continuously produced circularly-polarized light separating sheet, the transmission spectrum was measured five times, once in every 10 m, in the same manner as in (1-6) of Example 1. The half-value width thereof was obtained. As a result, the difference between the highest value and the lowest value of the half value widths was 10 nm or less, confirming that the homogenous sheet was produced.

Examples 8 to 12 and Comparative Examples 3 to 4

Lengthy circularly-polarized light separating sheets were produced and the transmission spectrum was measured in the same manner as in Example 7, except that the composition of the cholesteric liquid crystal composition was the same as the one used in Examples 2 to 6 and Comparative Examples 1 to 2. The obtained half value widths of the transmission spectrum are shown in Table 3.

TABLE 3

| | Ex. 8 | Ex. 9 | Ex. 10 | Ex. 11 | Ex. 12 | Comp. Ex. 3 | Comp. Ex. 4 |
|---|---|---|---|---|---|---|---|
| Highest half value width (nm) | 310 | 320 | 390 | 330 | 315 | 250 | 140 |
| Lowest half value width (nm) | 307 | 315 | 380 | 320 | 305 | 180 | 90 |
| (Highest half value width− | 3 | 5 | 10 | 10 | 10 | 70 | 50 |

TABLE 3-continued

| | Ex. 8 | Ex. 9 | Ex. 10 | Ex. 11 | Ex. 12 | Comp. Ex. 3 | Comp. Ex. 4 |
|---|---|---|---|---|---|---|---|
| lowest half value width) (nm) | | | | | | | |

The invention claimed is:

1. A cholesteric liquid crystal composition comprising a nematic liquid crystal compound having at least two reactive groups, one or more species of chiral agent, and a compound (B) each molecule of which has one reactive group, wherein said composition has:
    a refraction index anisotropy Δn value of 0.18 or more, and
    a property wherein an absolute value of a temperature dependency parameter δλ is 0.50 or less as measured using a value "a" of 25 and a value "b" of 100, wherein said parameter δλ is calculated by the formula (1):

$$\delta\lambda = \{2(\lambda b - \lambda a)/(\lambda b + \lambda a)\} \times \{100/(b-a)\} \quad \text{formula (1)}$$

wherein "a" and "b" represent temperatures (° C.), λa represents a selective reflection center wavelength (nm) of said liquid crystal composition at "a" ° C., λb represents a selective reflection center wavelength (nm) of said liquid crystal composition at "b" ° C.

2. The cholesteric liquid crystal composition according to claim 1, wherein said chiral agent has a helical twisting power HTP of 9.0 μm$^{-1}$ or more at 25 ° C., wherein HTP is calculated by the formula (2):

$$HTP = 1/(P \times 0.01C) \quad \text{formula (2)}$$

wherein C is the concentration of said chiral agent (wt%) in said liquid crystal composition, and P is a pitch length (μm) of said nematic liquid crystal compound in said liquid crystal composition.

3. The cholesteric liquid crystal composition according to claim 1, wherein:
    said nematic liquid crystal compound having at least two reactive groups is a rod-shaped liquid crystal compound (A); and
    the weight ratio of (A) and (B) is 95/5 to 50/50.

4. The cholesteric liquid crystal composition according to claim 3, wherein:
    said rod-shaped liquid crystal compound (A) lacks chirality;
    said compound (B) has a non-liquid crystal property and lacks chirality; and
    said chiral agent has a chirality, and each molecule of said chiral agent has one or more reactive groups.

5. A circularly-polarized light separating sheet comprising a layer of a cured product of the cholesteric liquid crystal composition of claim 1, and having a selective reflection bandwidth of 300 nm or more.

6. A method for producing a circularly-polarized light separating sheet, said method comprising:
applying the cholesteric liquid crystal composition of claim 1 onto a transparent resin substrate to obtain a liquid crystal layer; and
applying at least one step of light irradiation and/or heating to said liquid crystal layer for curing said liquid crystal layer.

7. A liquid crystal display device comprising a circularly-polarized light separating sheet of claim 5.

8. The cholesteric liquid crystal composition according to claim 3, wherein:
said compound (B) is a compound represented by the following formula (4):

$$R^1\text{-}A^1\text{-}B\text{-}A^2\text{-}R^2 \qquad (4)$$

wherein one of $R^1$ and $R^2$ is selected from the group consisting of (meth)acryl, (thio)epoxy, oxetane, thietanyl, aziridinyl, pyrrol, vinyl, allyl, fumarate, cinnamoyl, oxazoline, mercapto, iso(thio)cyanate, amino, hydroxyl, carboxyl and alkoxysilyl,
the other of $R^1$ and $R^2$ is selected from the group consisting of a straight or branched alkyl group having 1 to 20 carbon atoms, a straight or branched alkylene oxide group having 1 to 20 carbon atoms, hydrogen atom, halogen atom and cyano,
$A^1$ and $A^2$ are each independently selected from the group consisting of 1,4-phenylene, 1,4-cyclohexylene, 1,4-cyclohexenyl, 4,4'-biphenylene, 4,4'-bicyclohexylene and 2,6-naphthylene groups which maybe unsubstituted or substituted with one or more of halogen atom, hydroxyl group, carboxyl group, cyano group, amino group, and an alkyl or halogenated alkyl group having 1 to 10 carbon atoms, and
B is selected from the group consisting of a single bond, —O—, —S—, —S—S—, —CO—, —CS—, —OCO—, —CH$_2$—, —OCH$_2$—, —CH=N—N=CH—, —NHCO—, —OCOO—, —CH$_2$COO— and —CH$_2$OCO—.

9. The cholesteric liquid crystal composition according to claim 1, wherein:
the liquid crystal composition has a viscosity of 100 mPa·s or higher at 90° C.

10. A method for producing a circularly-polarized light separating sheet according to claim 6, wherein;
the light irradiation is an irradiation with ultraviolet ray of 0.01 to 50 mJ/cm$^2$.

* * * * *